(12) United States Patent
Albers et al.

(10) Patent No.: US 6,203,436 B1
(45) Date of Patent: Mar. 20, 2001

(54) UNIVERSAL JOINT

(75) Inventors: Hartmut Albers, Stuttgart; Karl-Heinz Ilzhoefer, Kirchheim, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/148,544

(22) Filed: Sep. 4, 1998

(30) Foreign Application Priority Data

Sep. 4, 1997 (DE) .............................................. 197 38 621

(51) Int. Cl.⁷ ...................................................... F16D 3/62
(52) U.S. Cl. ................................................ 464/69; 464/93
(58) Field of Search ................................. 464/55, 69, 93, 464/94, 95

(56) References Cited

U.S. PATENT DOCUMENTS

| | | | |
|---|---|---|---|
| 1,424,051 | | 7/1922 | Wayne . |
| 2,182,711 | | 12/1939 | Thomas . |
| 3,460,628 | * | 8/1969 | Tankersley ........................ 464/69 X |
| 4,118,952 | * | 10/1978 | Kobayashi ............................. 464/69 |
| 4,768,992 | | 9/1988 | Mancuso et al. . |
| 5,033,988 | * | 7/1991 | McGuire et al. ................. 464/93 X |
| 5,540,621 | | 7/1996 | Keester et al. . |
| 5,562,545 | | 10/1996 | Wähling et al. . |

FOREIGN PATENT DOCUMENTS

| | | |
|---|---|---|
| 3641547C1 | 7/1988 | (DE) . |
| 41 40311A1 | 6/1993 | (DE) . |
| 43 04 274C1 | 3/1994 | (DE) . |
| 297 08 814 U1 | 8/1997 | (DE) . |
| 917680 | 2/1963 | (GB) . |
| 1396200 | 4/1975 | (GB) . |
| 3-229018 * | 10/1991 | (JP) ........................................ 464/69 |
| 571636 * | 9/1977 | (SU) ....................................... 464/94 |

* cited by examiner

*Primary Examiner*—Lynne H. Browne
*Assistant Examiner*—Greg Binda
(74) *Attorney, Agent, or Firm*—Evenson, McKeown, Edwards & Lenahan, P.L.L.C.

(57) ABSTRACT

A universal joint with flanges located at the ends of two shafts connected by the joint includes three driving tabs projecting axially from the respective flanges. Each of the total of six driving tabs being located opposite a gap located uniformly on the circumference of a common partial circle. These tabs are connected with one another by means of a hexagonal axially elastically deformable joint ring provided with sockets at the corner points. The joint ring in turn is formed in a multipartite fashion by a ring of several driving loops that are endless, oval, and each wrapped around two adjacent sockets, said loops preferably being made of endless-fiber-reinforced plastic. In order to be able to allow higher bending angles of the universal joint without a significant increase in the stress on the parts, the driving loops in their supporting cross sections according to the invention have an axially flexible rectangular cross-sectional shape resembling a leaf spring, with the longer cross section side, with a side ratio preferably of at least 1:4, being located in an axially perpendicular plane of the universal joint. In the sockets, at least in the areas wrapped by the driving loops. Position-stabilizing circumferential grooves are provided that correspond to the cross-sectional shape of the driving loops. In the circumferential area not wrapped by the driving loops, the side flanks of the position-stabilizing circumferential grooves of the sockets are either expanded or cut away.

12 Claims, 8 Drawing Sheets

UNIVERSAL JOINT

BACKGROUND AND SUMMARY OF THE INVENTION

This application claims the priority of German application 197 38 621.0, filed in Germany on Sep. 4, 1997.

The invention takes its departure from a universal joint of the type described in German Patent Document DE 43 04 274C1.

Universal joints of this type, when used in vehicles, are not only subjected to very high mechanical loads as a result of torque peaks and by movements of the joint that are excessive, but there is also a thermal stress on the universal joint caused by heat conduction and heat radiation from parts in the vicinity, some of which are very hot. As a result of the heating of the parts, the loading capacity of the materials used is reduced in the case of plastic parts so that the thermal stress on the universal joint is relevant to its mechanical loading capacity.

Many known universal joints, like those provided in particular for lightweight designs of propeller shafts, have at the ends of the two shafts joined by the joint, flanges with three driving tabs projecting axially in the direction of the universal joint, with the total of six driving tabs, each located opposite a gap, being arranged uniformly around the circumference of a common partial circle. The driving tabs are connected nonrotatably with one another by a joint ring that is flexible, hexagonal, and has sockets at the corner points. The joint ring is axially elastically deformable between the sockets so that the two flanges connected by the joint ring can perform (limited) angular movements in any desired direction, even during rotation. As a result of this angular movement, the joint ring becomes axially corrugated, so that within the scope of elasticity in accordance with Hooke's law, bending stresses result that are superimposed on the operating stresses produced by the torque. As a result of this superimposition of stresses, the limit of the strength of the material can be reached. Accordingly, for reasons of long-term strength, universal joints can be allowed only limited bending angles.

The number of three drive tabs per flange, in other words a total of six driving tabs in the universal joint, is not absolutely necessary. It is also possible to have only two tabs per flange, in other words a total of four driving tabs, but because of the distribution of the circumferential load on this small number of driving elements, the latter are subjected to greater stress than when the number of driving tabs is greater. In addition, four or more tabs per flange, in other words a total of eight or more driving tabs, are also possible in the universal joint, and as the number of driving tabs increases, the required diameter of the joint increases and/or the tolerable bending angle becomes smaller. For this reason, the number given above of three to six driving tabs represents the most frequent compromise between the loads on individual parts on the one hand and the size of the joint on the other.

German Patent Document DE 41 40 311 A1 shows a hexagonal joint ring made of composite fiber material in the form of an annular disk in which axial sockets are formed in the reinforced corner areas. The rectilinear areas between two adjacent corners are formed by a relatively thin rib extending in the plane of the annular disk and composed of several combined layers of cured bonded fiber material. This rib is relatively wide in the radial direction. When the universal joint bends, these ribs are not only bent but also twisted. Although the thin ribs can bend elastically at relatively low bending stresses, because of the shape of the ribs, which differs sharply from rotational symmetry, high stresses develop when they are twisted, particularly at their inner and outer edges.

German Patent Document DE 43 04 274 C1 mentioned at the outset teaches a hexagonal joint ring in which the sockets located in the corner areas are connected with one another pairwise by endless oval driving loops wrapped externally around two adjacent sockets. Variable-width, centrally located driving loops and a pair of narrow driving loops located at the edge are provided in the joint ring. The wide driving loop is approximately three times as wide as its radial wall thickness; the two narrow driving loops together are approximately the same width. The driving loops can pivot radially on the sockets so that the joint ring can be changed in shape with articulation as an individual part. To hold together all the parts of the joint ring and to prevent dirt from entering, the parts of the joint ring are embedded in a rubber-elastic material of low hardness and completely enclosed. Because the wall thickness is relatively small in relation to the axially measured width of the driving loops, they offer good conditions for accepting the circumferential pull with low excessive stresses at the curves of the driving loops. When this universal joint is bent, the driving loops are tilted or inclined in the axial direction and are also twisted, so that considerable excess stresses develop at various points in the driving loops. During tilting, there is a unilateral edge contact between the loop curve and the socket and accordingly there is a concentration of stresses at that point. When the relatively wide driving loops are twisted, similarly to the ribs of the previously described joint disk according to German Patent Document DE 41 40 331 A1, excessive stresses develop at the edges, though at a lower level than in the other case. This type of joint ring therefore does not offer any good conditions for good mobility of the universal joint when being simultaneously subjected to a high torque.

A goal of the invention is to improve the universal joint that serves as the basis according to the species in such fashion that relatively high bending angles can be permitted readily during rotation under high mechanical and thermal loads.

Taking its departure from the basic universal joints of the type referred to above, this goal is achieved according to certain preferred embodiments of the invention by providing a universal joint for joining two shafts such that they are axially and angularly movable within certain limits with respect to one another, comprising: shaft flanges located at facing ends of the two shafts, each of said shaft flanges having a plurality of axially projecting driving tabs with respective driving tabs of one shaft flange being disposed in use intermediate respective driving tabs of the other shaft flange along a common circle surrounding an axis through said universal joint, and a joint ring assembly connecting the respective driving tabs with one another, said joint ring assembly including: respective driving tab accommodating sockets disposed at respective corner points of a polygonal configuration, and oval driving loops wrapped around respective pairs of adjacent sockets, said driving loops having a rectangular cross-sectional shape with respective longer cross-sectional sides extending in a radial plane of the universal joint and respective shorter cross-sectional sides extending axially of the universal joint, the longer cross-sectional sides of the supporting cross-sections of the driving loops being at least four times longer than the shorter cross-sectional sides, said driving loops forming legs extending between adjacent sockets surrounded by the respective driving loops, which legs are axially yieldable and elastically twistable, wherein the sockets are provided with position-stablizing circumferential grooves at least in areas wrapped by the driving loops, said grooves matching the cross-sectional shapes of the driving loops so as to receive the driving loops in a position-stablizing manner while permitting the loops to bend and twist elastically like leaf spring tongues, wherein lateral flanks of the circumferential grooves of the socket expand in a circumferential area not wrapped by the driving loops, and wherein the sockets are rotationally asymmetrical and are secured against twisting within the joint ring.

According to preferred embodiments of the invention, the driving loops secured in a stable position on the sockets can bend and twist elastically like leaf spring tongues, so that because of the axial travel and the pivoting movements that the driving tabs perform with respect to one another during operation, the driving loops accordingly are subjected only to a readily tolerable stress. Because of this, relatively large bending angles and/or relatively high ambient temperatures can be permitted.

Other objects, advantages and novel features of the present invention will become apparent from the following detailed description of the invention when considered in conjunction with the accompanying drawings.

DETAILED DESCRIPTION OF THE DRAWINGS

Figure 1:
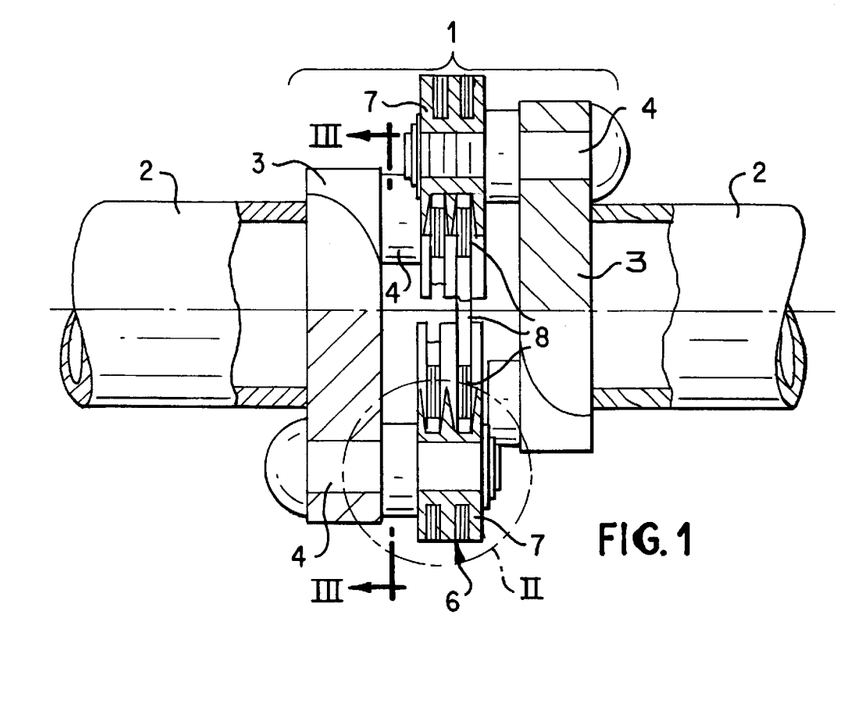
FIG. 1 is a lateral sectional view of a pair of shafts connected by a universal joint constructed in accordance with a preferred embodiment of the present invention.

The embodiment shown in FIGS. 1 to 4 will be discussed first. FIG. 1 shows a universal joint 1, by way of which two shafts 2 can be connected to one another in a rotationally rigid manner but able to move axially and/or angularly within certain limits. At the ends of the two shafts 2 joined by the joint 1, a flange 3 is provided. Each of said flanges 3 in the embodiment shown having three driving tabs 4 projecting axially in the direction of the universal joint. Each of the six driving tabs 4 being located opposite a gap between facing driving tabs of the other shaft, arranged uniformly around the circumference of a common partial circle 5.

Figure 3:
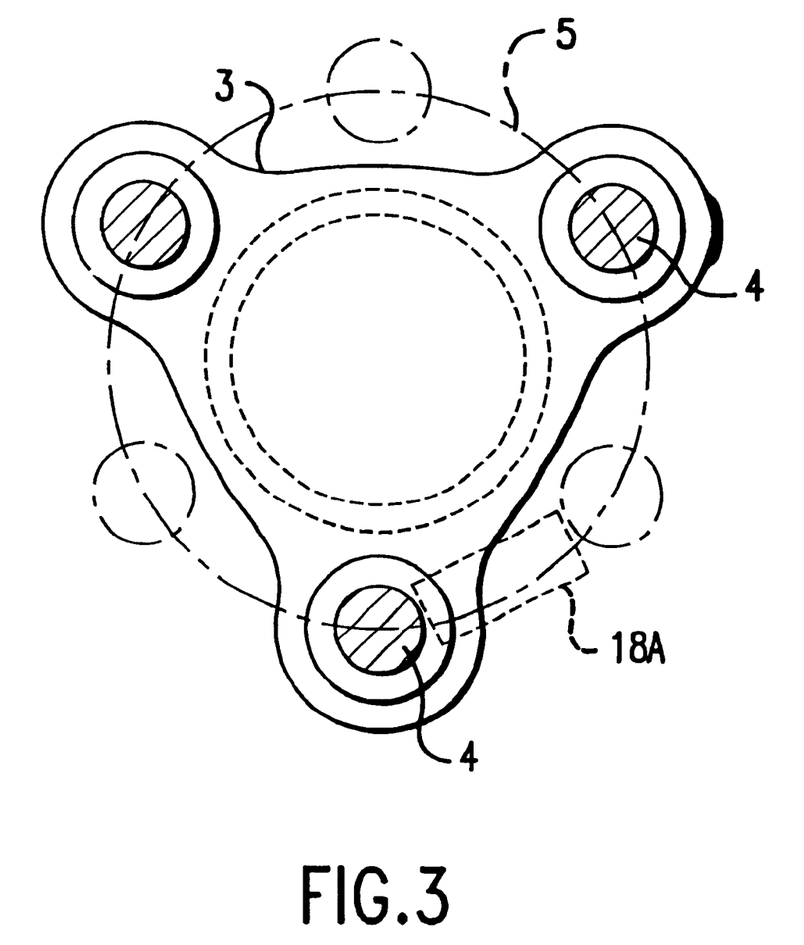
FIG. 3 is an axial view of the shaft flange of the shaft shown at the left in FIG. 1, in a section along line III—III.

Flanges 3, as is clearly shown in FIG. 3, are cut away in the circumferential areas located between the driving tabs, i.e. theoretically made in the shape of a star. Because of this star shape of the opposite flanges, with arms located opposite gaps, the flanges can mesh with one another during angular movements, providing a greater angular mobility of the universal joint.

The driving tabs 4 at the ends of the flange arms are connected alternately with one another in a nonrotatable fashion by a flexible, regularly polygonal and preferably hexagonal joint ring 6, said ring being provided at the corner points with sockets 7. The legs (of the driving loops 8) of the joint ring located between the sockets 7 are axially deformable and twistable.

The joint ring in turn is made multipartite and is composed of a circle of several endless oval driving loops 8 each of which is wrapped around two adjacent sockets 7, in the manner of individual chain links, said loops being pivotable radially on the sockets so that joint ring 6 can be changed in shape with articulation. However, as a result of the axial bending and twisting of the individual driving loops, the latter are subjected to stress by axial tilting and twisting in addition to the tensile stresses produced by the torque, so that the total load which the universal joint can tolerate must be reduced accordingly.

In order to be able to bend the universal joint relatively sharply and without difficulty even under high mechanical and thermal stress during rotation, without adversely affecting the long-term loading capacity of the universal joint in an unacceptable fashion, driving loops 8 according to the invention have a rectangular cross section in their supporting cross sectional areas and are designed and arranged such that the longer cross section sides 9 are disposed in a radial plane of the universal joint when the shafts 2 are axially aligned. The longer cross section sides 9 of the supporting cross sections of the driving loops are preferably at least four times longer than the shorter cross section sides 10.

Figure 5:
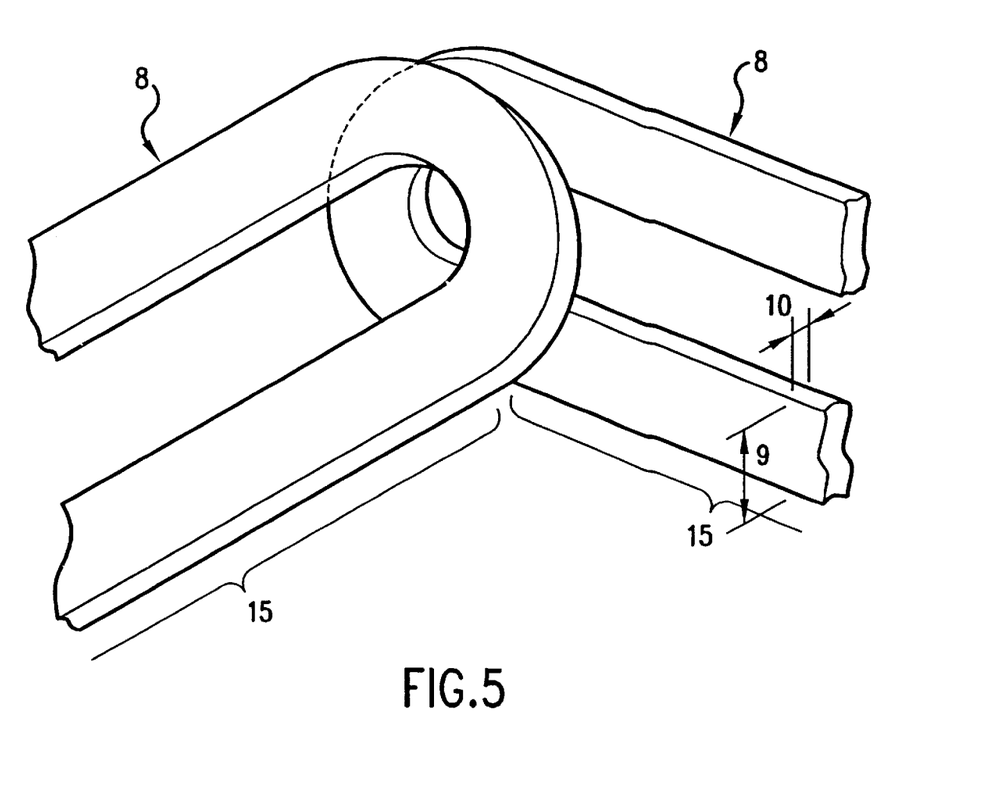
FIG. 5 is a detailed perspective view showing two driving loops mounted on a socket of the universal joint of FIG. 1.
Figure 10:
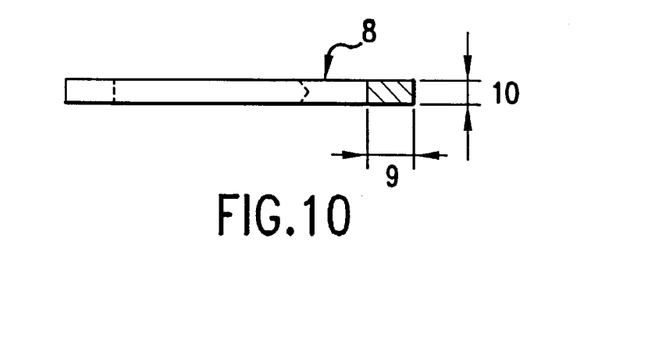
FIG. 10 is a detailed radial view of a driving loop used in the joint ring according to FIGS. 6 and 7.
Figure 11:
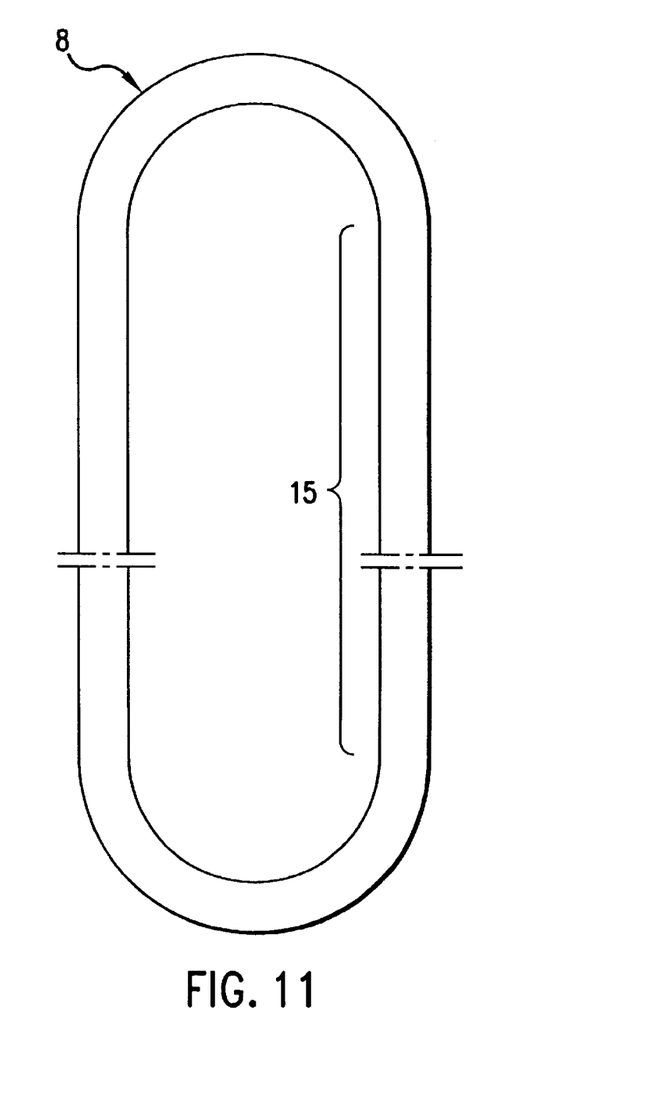
FIG. 11 is an axial view of the driving loop shown in FIG. 10.

FIG. 5 shows two driving loops in perspective, corresponding to their installed position, but individually, and in FIGS. 10 and 11 a driving loop is shown in two different views. The straight legs 15 of the driving loops, because of this cross-sectional dimensioning, yield axially in the manner of a leaf spring and are elastically twistable. Position-stabilizing circumferential grooves 11 are provided in the sockets 7 which, at least in the areas wrapped by the driving loops 8, correspond to the cross-sectional shape of the driving loops 8 and secure the driving loops in this curved wrapping area against tilting and twisting.

Figure 2:
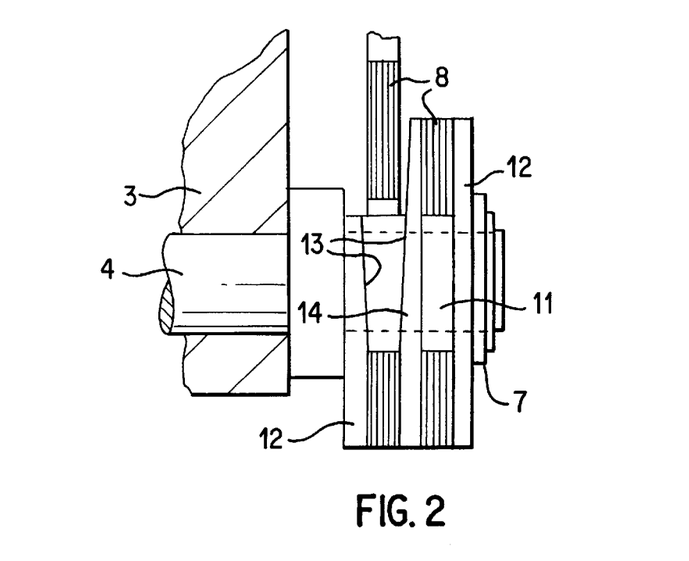
FIG. 2 is an enlarged detailed view of detail II in FIG. 1.
Figure 4:
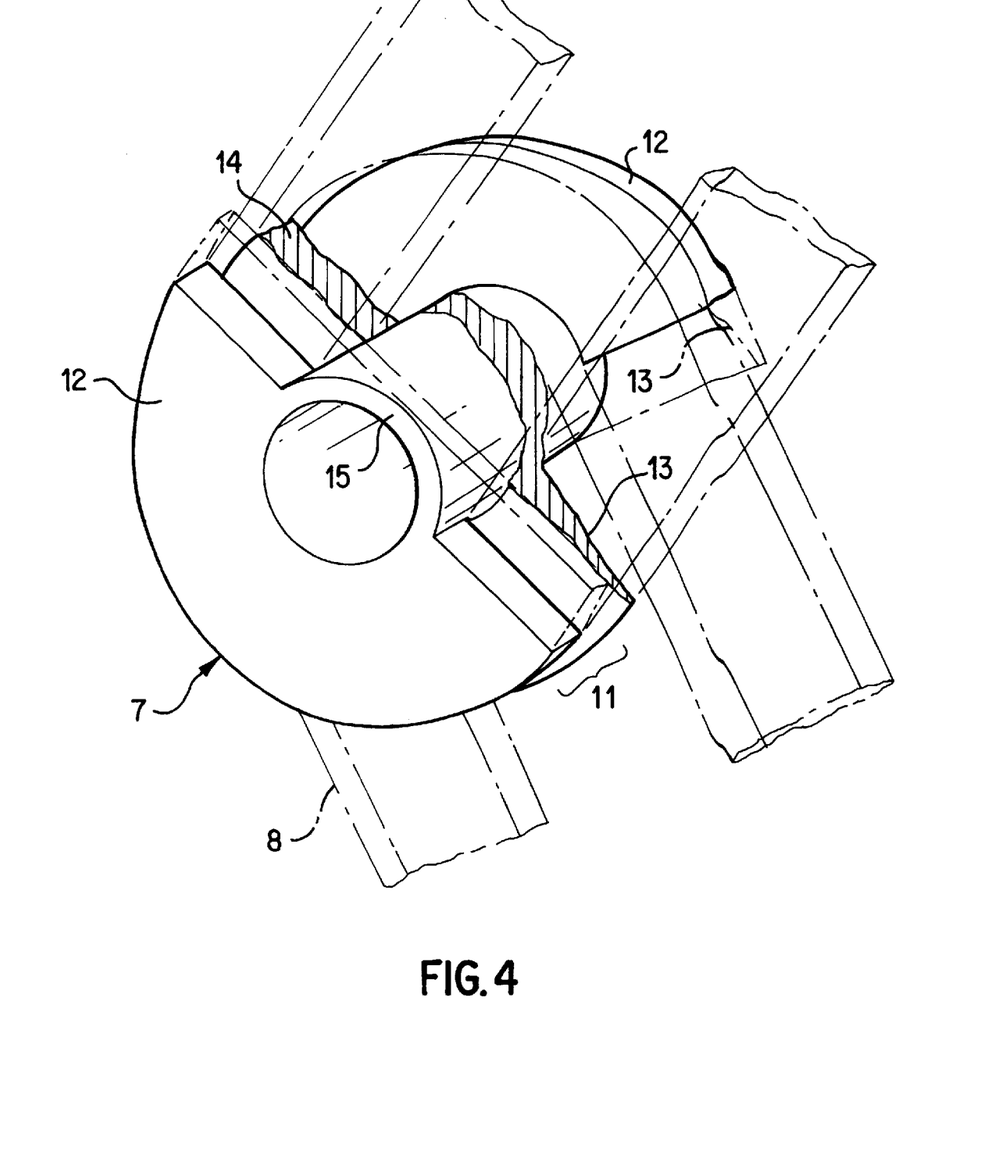
FIG. 4 is a detailed perspective part sectional view of one of the sockets of the universal joint of FIG. 1, with the position of the driving loops indicated.

The lateral flanks of the position-stabilizing circumferential grooves 11 of the sockets 7 in FIGS. 2 and 4 expand axially in the circumferential area that is not wrapped by the driving loops—see bevel 13 in FIG. 2 or FIG. 4—so that straight legs 15 can swing axially without impediment in this part of the circumferential groove.

The lateral flanks of the position-stabilizing circumferential grooves located axially endwise on sockets 7 are also partially eliminated to allow the driving loops to be mounted on the sockets. Flange 12 is capped in the circumferential area that is not wrapped by the corresponding driving loop.

In the embodiment as shown in solid lines in FIG. 4, endwise flanges 12 are cut away up to the middle of the socket 7 (tubular core). The endwise flanges 12 must be removed for assembly reasons at least up to a tangential line that contacts tubular core 16 of the socket 7, with this tangential line preferably running orthogonally to the installation location of the corresponding driving loop. This possibility is illustrated by the dot-dashed lines in FIG. 4. Advantageously, sockets 7 that are not made rotationally symmetrical are secured against twisting within the joint ring, in order to secure the respective installation position of the sockets. This securing possibility however is not shown in FIG. 1. The sockets can be secured against twisting for example by corresponding tightening by screwing or by axial tensioning of the sockets by means of driving tab 4. In the embodiment shown in FIG. 6, sockets 7' shown therein are protected against twisting by a potting material 17 or the like.

Middle rib 14 of socket 7 is provided as a continuous disk or flange, in other words the middle rib does not have to be shortened radially for assembly reasons. However, axial bevels 13 are likewise provided on the lateral flanks of circumferential grooves 11 formed by the rib, mirrorwise with respect to the lateral flanks of end flanges 12, so that the driving loops received in the circumferential grooves can swing axially in both directions without impediment.

The supporting cross section of driving loops 8 advantageously has a constant cross-sectional shape over its entire circumference. The driving loops can consist of endless-fiber-reinforced plastic or sheet spring steel.

To protect the sliding points against the entry of dirt and to hold the individual parts of joint ring 6, 6' together to form a closed and maneuverable workpiece, all the parts of the joint ring are embedded in a rubber-elastic material of low hardness and are completely surrounded by it. Alternatively, it is possible to spray the individual parts of the joint ring with a soft, elastic plastic. This potting material, marked 17 in the embodiment in FIG. 6, in the state prior to complete assembly of the joint ring in the universal joint, also holds the sockets in the desired rotational position.

Figure 8:
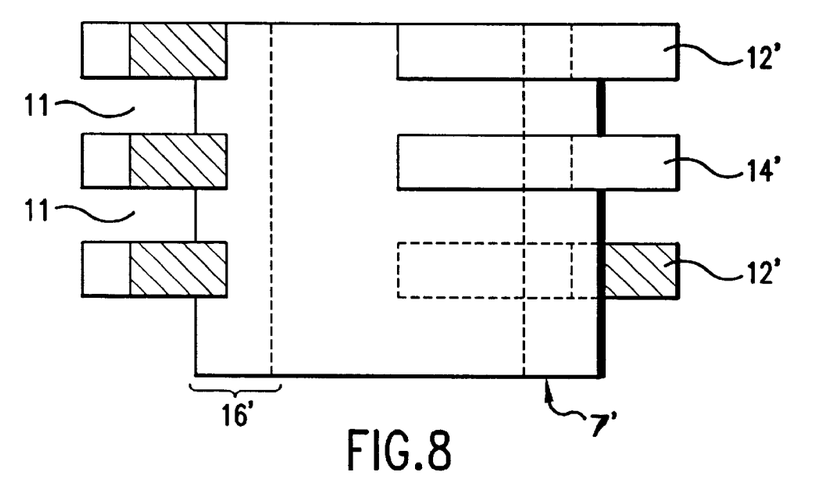
FIG. 8 is a considerably enlarged detailed radial view of a socket used in the joint ring according to FIGS. 6 and 7.
Figure 9:
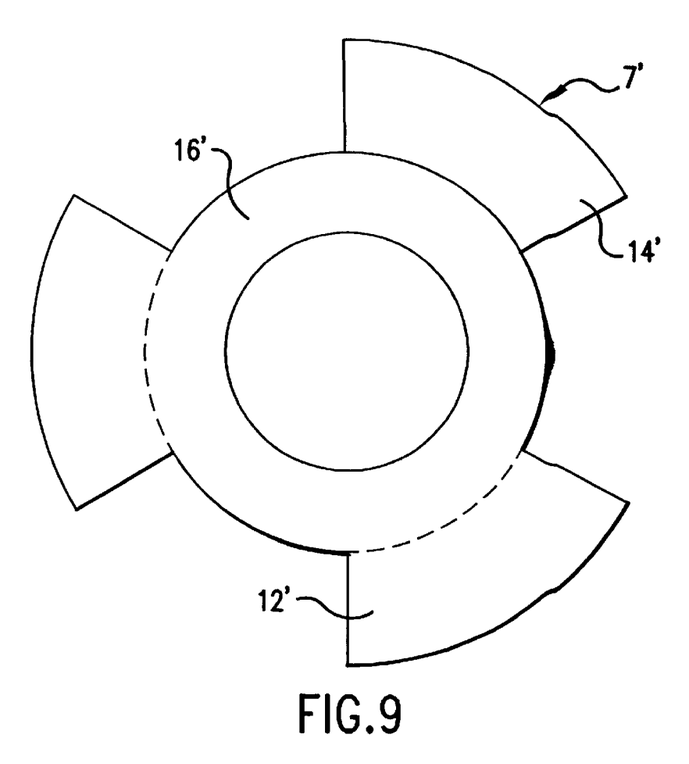
FIG. 9 is an axial view of the socket shown in FIG. 8.

The embodiment of a joint ring 6' shown in FIGS. 6 to 11 differs from the corresponding joint ring of the universal joint in FIGS. 1 to 4 essentially in the design of sockets 7', one of which is shown enlarged in FIGS. 8 and 9. These sockets are optimized in terms of weight and casting technology. The two end flanges 12' are cut away in the circumferential area not wrapped by the driving loops up to the middle of tubular core 16' or are not provided, and in addition are reduced in weight in the wrapped circumferential area by eliminating a centrally located sector. The resultant recess also offers an advantage for casting technology in that the socket can be made in a pressure die-casting or injection-molding tool that is easier to design. The recess that is formed also facilitates the installation of driving loops 8 on socket 7'. The two end flanges 12' therefore also have only two relatively narrow sectoral retaining segments which, in the embodiment shown, each extend over an angle of 60°; the sector that is cut away likewise extends over 60°. Middle rib 14' has three sectoral recesses and therefore three sectoral retaining segments each of which likewise extends over 60°. Two of the sectoral retaining segments of middle rib 14' are located at each driving loop 8 on the same circumference. In addition, the sectoral retaining segments are narrower at their widest point than the distance between the two legs 15 of the driving loop, so that a sectoral retaining segment can enter between the two legs of the adjacent driving loops when the universal joint is bent.

Figure 6:
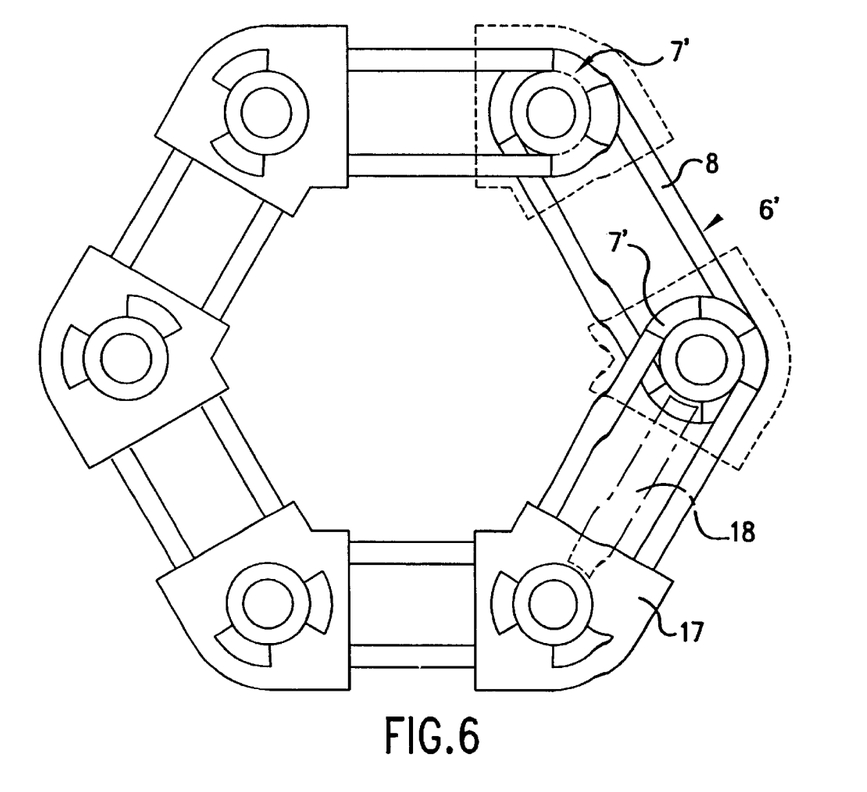
FIG. 6 is an axial view similar to FIG. 3 showing another embodiment of a joint ring according to the invention.
Figure 7:
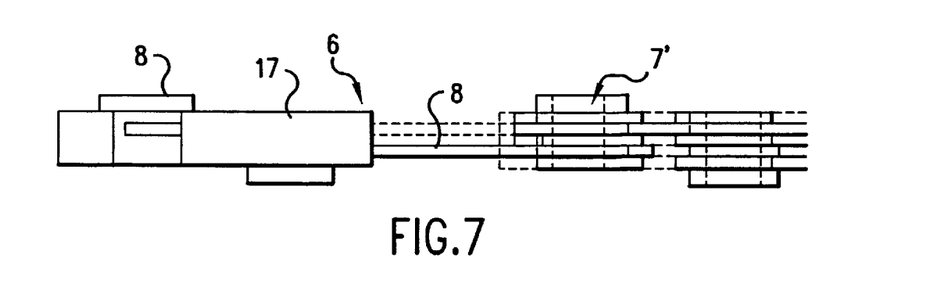
FIG. 7 is a radial schematic view of the joint ring of FIG. 6.

In connection with the axial view of joint ring 6' in FIG. 6, a possibility shown in that figure by dot-dashed lines should also be pointed out. Namely, a pressure rod 18 can be introduced into the interior of each driving loop, said rod abutting at its ends the envelopes of tubular cores 16' of the adjacent sockets.

In FIG. 3, a corresponding pressure rod 18A is schematically depicted.

Although a total of six driving loops 8 is provided in the universal joints shown, only half of the total number of driving loops contributes to transmitting torque in each rotational direction. The load on the driving loops can be reduced by the pressure rods, 18, 18A which likewise engage by their ends the circumferential grooves 11 of sockets 7, 7' in a force-transmitting manner. Pressure rod 18 is provided at its two ends with saddle surfaces that fit the circumferential shapes of cores 16' of the sockets. When the universal joint is subjected to a torque load in a certain rotational direction, every other driving loop and the three pressure rods 18 located in the interior of the unloaded driving loops take part in transmitting torque. The pressure rods 18A of the FIG. 3 arrangement operate in a similar manner. As a result, the load is distributed over a number of power-transmitting elements that is twice as high.

Figure 12:
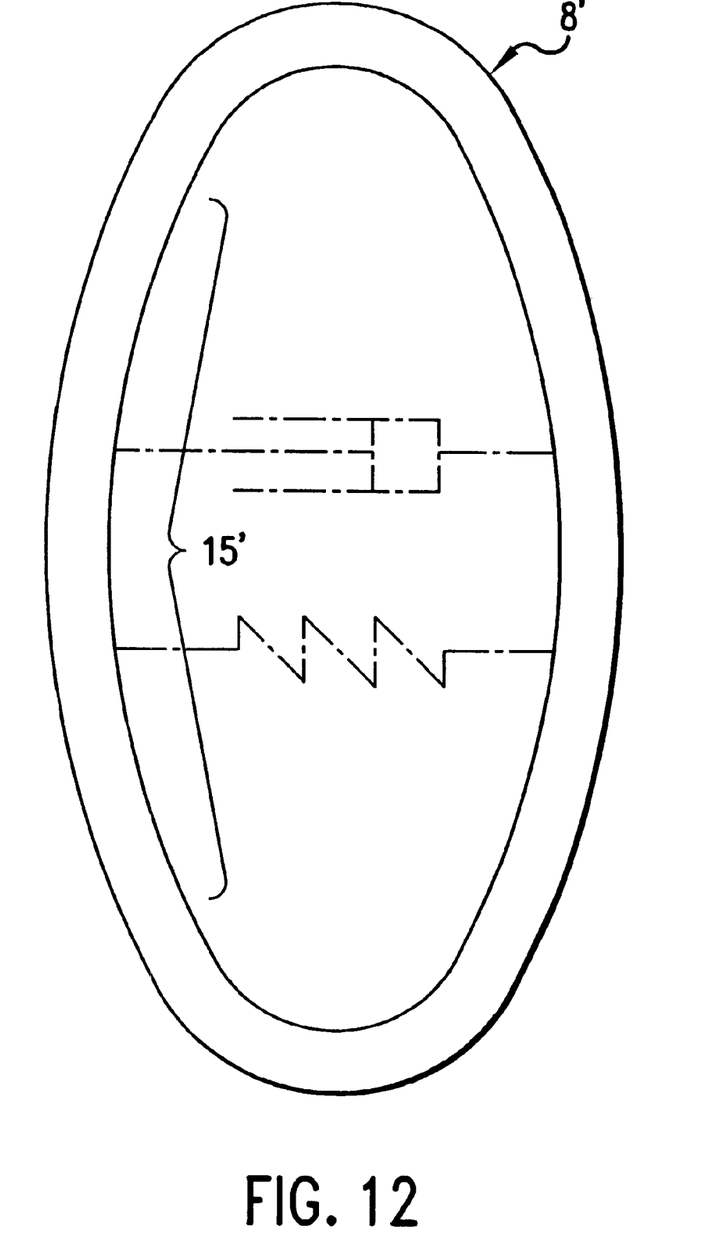
FIG. 12 is a detailed view of an oval embodiment of a driving loop, according to other preferred embodiments of the invention.

In FIG. 12 a modification is shown of an oval driving loop 8', in other words one that approximates an elliptical shape, with legs 15' curved in an arc on the long sides of the oval. As a result of the arcuate curvature of these legs 15', the driving loops can stretch elastically when subjected to tension, whereupon the two curved legs assume an extended position. This elasticity of the driving loop is symbolized by a spring indicated by dot-dashed lines and shown schematically. Since at least plastics have a certain degree of natural damping by virtue of their material, elastic deformations of a driving loop that is made of plastic can be restored to normal by only a low restoring force. Rotary oscillations therefore can be damped by such an elliptical driving loop in the universal joint. This damping property is symbolized by a damping member that is shown in FIG. 12 by dot-dashed lines and illustrated schematically.

The elasticity of driving loop 8' with arcuate legs 15' and its damping property can be determined by more than a suitable choice of the material of the driving loops and integrated fiber reinforcement as mentioned above. In addition, or by way of substitution, one or the other property, the elasticity or damping, can also be achieved by a compression body located in the interior of the oval and made of rubber-elastic material. Such a compression body is inserted under at least slight pretensioning into the interior of the driving loop and completely fills the open area between the opposite legs 15'. To prevent lateral slippage out of the driving loop, the compression body is secured shapewise by projecting flange-like retaining ribs in the driving loop.

Rectilinear pressure rods made of the same material as driving loop 15' can also be integrated into an elastic compression body of this kind, said rods accepting a load instead of the driving loops, which are not subjected to tension and can relieve the load on those driving -Loops that are subjected to tension. The pressure rods have their ends abutting the exposed circumferential surfaces of the two opposite sockets around which a driving loop is wrapped. For more details of this technology, see commonly assigned corresponding U.S. patent application Ser. No. 09/080,347, filed May 18, 1998.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Universal joint for joining two shafts such that they are axially and angularly movable within certain limits with respect to one another, comprising:

shaft flanges located at facing ends of the two shafts, each of said shaft flanges having a plurality of axially projecting driving tabs with respective driving tabs of one shaft flange being disposed in use intermediate respective driving tabs of the other shaft flange along a common circle surrounding an axis through said universal joint, and a joint ring assembly connecting the respective driving tabs with one another, said joint ring assembly including:

respective driving tab accommodating sockets disposed at respective corner points of a polygonal configuration, and oval driving loops wrapped around respective pairs of adjacent sockets, said driving loops having a rectangular cross-sectional shape with respective longer cross-sectional sides extending in a radial plane of the universal joint and respective shorter cross-sectional sides extending axially of the universal joint, the longer cross-sectional sides of the supporting cross-sections of the driving loops being at least four times longer than the shorter cross-sectional sides, said driving loops forming legs extending between adjacent sockets surrounded by the respective driving loops, which legs are axially yieldable and elastically twistable, wherein the sockets are provided with position-stablizing circumferential grooves at least in areas wrapped by the driving loops, said grooves matching the cross-sectional shapes of the driving loops so as to receive the driving loops in a position-stablizing manner while permitting the loops to bend and twist elastically like leaf spring tongues, wherein lateral flanks of the circumferential grooves of the socket expand in a circumferential area not wrapped by the driving loops, and wherein the sockets are rotationally asymmetrical and are secured against twisting within the joint ring.

2. Universal joint according to claim 1, wherein the supporting cross-sections of the driving loops have a constant cross-sectional shape over their entire length.

3. Universal joint accounting to claim 1, wherein the driving loops consist of endless fiber reinforced plastic.

4. Universal joint according to claim 1, wherein the driving loops consist of sheet spring steel.

5. Universal joint according to claim 1, wherein three of said driving tabs are provided at each of said shaft flanges.

6. Universal joint according to claim 1, comprising a pressure rod extending between and abutting adjacent sockets.

7. Universal joint for joining two shafts such that they are axially and angularly movable within certain limits with respect to one another, comprising:

shaft flanges located at facing ends of the two shafts, each of said shaft flanges having a plurality of axially projecting driving tabs with respective driving tabs of one shaft flange being disposed in use intermediate respective driving tabs of the other shaft flange along a common circle surrounding an axis through said universal joint, and a joint ring assembly connecting the respective driving tabs with one another, said joint ring assembly including:

respective driving tab accommodating sockets disposed at respective corner points of a polygonal configuration, and oval driving loops wrapped around respective pairs of adjacent sockets, said driving loop s having a rectangular crosss-sectional shape with respective longer cross-sectional sides extending in a radial plane of the universal joint and respective shorter cross-sectional sides extending axially of the universal joint, the longer cross-sectional sides of the supporting cross-sections of the driving loops being at least four times longer than the shorter cross-sectional sides, said driving loops forming legs extending between adjacent sockets surrounded by the respective driving loops, which legs are axially yieldable and elastically twistable, wherein the sockets are provided with position-stablizing circumferential grooves at least in areas wrapped by the driving loops, said grooves matching the cross-sectional shapes of the driving loops so as to receive the driving loop in a position-stablizing manner while permitting the loops to bend and twist elastically like leaf spring tongues, wherein socket flanges are located axially endwise at the respective sockets to form axially external lateral flanks of the respective circumferential grooves, said socket flanges being completely cut away in circumferential areas not wrapped by corresponding driving loops, at least up to a tangential line that is orthogonal to installation locations of the corresponding driving loops and up to a contact position on a tubular core of the respective socket, and wherein said sockets are secured against twisting within the joint ring assembly.

8. Universal joint according to claim 7, wherein the supporting cross-sections of the driving loops have a constant cross-sectional shape over their entire length.

9. Universal joint according to claim 7, wherein the driving loops consist of endless fiber reinforced plastic.

10. Universal joint according to claim 7, wherein the driving loops consist of sheet spring steel.

11. Universal joint according to claim 7, wherein three of said driving tabs are provided at each of said shaft flanges.

12. Universal joint according to claim 7, comprising a pressure rod extending between and abutting adjacent sockets.

* * * * *